(12) United States Patent
La Forest et al.

(10) Patent No.: US 10,457,016 B2
(45) Date of Patent: Oct. 29, 2019

(54) DIFFERENTIAL NEEDLING OF A CARBON FIBER PREFORM

(71) Applicant: Honeywell International Inc., Morristown, NJ (US)

(72) Inventors: Mark L. La Forest, Theresa, NY (US); Neil Murdie, Granger, IN (US); Russell W. Johnson, Elmhurst, IL (US); Mark C. James, Plymouth, IN (US)

(73) Assignee: Honeywell International Inc., Morris Plains, NJ (US)

( * ) Notice: Subject to any disclaimer, the term of this patent is extended or adjusted under 35 U.S.C. 154(b) by 395 days.

(21) Appl. No.: 15/051,259

(22) Filed: Feb. 23, 2016

(65) Prior Publication Data

US 2017/0239911 A1 Aug. 24, 2017

(51) Int. Cl.
*B32B 5/06* (2006.01)
*C04B 35/52* (2006.01)
(Continued)

(52) U.S. Cl.
CPC ............ *B32B 5/06* (2013.01); *B32B 3/266* (2013.01); *B32B 5/26* (2013.01); *B32B 9/007* (2013.01);
(Continued)

(58) Field of Classification Search
CPC ........ B60G 2400/37; B62B 2005/0471; D04H 3/102–105; D04H 1/46–465;
(Continued)

(56) References Cited

U.S. PATENT DOCUMENTS 3,639,197 A * 2/1972 Spain ................ F16D 69/023
156/169
5,654,059 A 8/1997 Hecht
(Continued)

FOREIGN PATENT DOCUMENTS

| CN | 103909691 A | 7/2014 |
| EP | 0683261 A2 | 11/1995 |
| WO | 02081942 A1 | 10/2002 |

OTHER PUBLICATIONS

Xie et al., "Effect of needling parameters on the effective properties of 3D needled C/C-SiC composites," Science and technology on Advanced Composties in Special Enviroments Key Laboratory,Composites Science and Technology 117, Jun. 5, 2015, 9 pp.
(Continued)

*Primary Examiner* — Laura C Powers
*Assistant Examiner* — Larissa E Rowe
(74) *Attorney, Agent, or Firm* — Shumaker & Sieffert, P.A.

(57) ABSTRACT

A carbon-carbon composite preform including a plurality of layers including carbon fibers or carbon-precursor fibers, the layers include a first exterior layer defining a first major surface, a second exterior layer defining a second major surface, and at least one interior layer disposed between the first exterior layer and the second exterior layer, the at least one interior layer having a peripheral region that forms a portion of an outer surface of the preform. The preform includes needled fibers, where at least some needled fibers extend through two or more layers. The preform has an exterior region and a core region, where the exterior region includes at least the peripheral region of at least one interior layer. The needled fibers define a first needled fiber number
(Continued)

density (NFND) in the exterior region and a second greater NFND in at least a portion of the core region.

19 Claims, 8 Drawing Sheets

(51) Int. Cl.
| | |
|---|---|
| *B32B 18/00* | (2006.01) |
| *C04B 35/83* | (2006.01) |
| *D04H 1/4242* | (2012.01) |
| *D04H 1/46* | (2012.01) |
| *D04H 1/498* | (2012.01) |
| *D04H 3/002* | (2012.01) |
| *D04H 3/105* | (2012.01) |
| *F16D 65/12* | (2006.01) |
| *F16D 69/02* | (2006.01) |
| *B32B 5/26* | (2006.01) |
| *B32B 9/00* | (2006.01) |
| *F16D 69/00* | (2006.01) |
| *B32B 3/26* | (2006.01) |

(52) U.S. Cl.
CPC .............. *B32B 18/00* (2013.01); *C04B 35/52* (2013.01); *C04B 35/83* (2013.01); *D04H 1/4242* (2013.01); *D04H 1/46* (2013.01); *D04H 1/498* (2013.01); *D04H 3/002* (2013.01); *D04H 3/105* (2013.01); *F16D 65/126* (2013.01); *F16D 69/023* (2013.01); *B32B 2255/02* (2013.01); *B32B 2262/106* (2013.01); *B32B 2307/542* (2013.01); *B32B 2307/718* (2013.01); *B32B 2475/00* (2013.01); *B32B 2605/00* (2013.01); *C04B 2235/614* (2013.01); *C04B 2235/616* (2013.01); *C04B 2235/6567* (2013.01); *C04B 2235/77* (2013.01); *C04B 2237/385* (2013.01); *C04B 2237/586* (2013.01); *F16D 2069/005* (2013.01); *F16D 2200/006* (2013.01); *F16D 2200/0052* (2013.01); *F16D 2250/00* (2013.01)

(58) Field of Classification Search
CPC ........... D04H 5/02; D04H 13/003–005; D04H 1/4242; D04H 1/498; D04H 3/002; Y10S 156/927; Y10S 156/939; Y10T 428/24; Y10T 428/249921–249923; Y10T 428/249953–249954; Y10T 428/249961; Y10T 442/643; Y10T 442/659–673; Y10T 442/682–689; Y10T 442/662–667; B32B 5/06; B32B 5/26; B32B 9/007; B32B 18/00; B32B 2605/00; B32B 2255/02; B32B 2307/542; B32B 2307/718; B32B 2475/00; B32B 2262/106; C04B 35/52; C04B 35/83; C04B 2235/614; C04B 2235/616; C04B 2237/385; F16D 65/126; F16D 69/023; F16D 2069/005; F16D 2200/0052; F16D 2200/006
USPC ......... 428/98, 220–223, 304.4–305.5, 310.5; 442/366, 381–393, 402–408
See application file for complete search history.

(56) References Cited

U.S. PATENT DOCUMENTS

| | | | |
|---|---|---|---|
| 5,664,305 A | | 9/1997 | Lawton et al. |
| 5,705,264 A | | 1/1998 | Lawton et al. |
| 5,869,411 A | * | 2/1999 | Bazshushtari ........... D04H 1/46 428/408 |
| 5,908,792 A | | 6/1999 | Sheehan et al. |
| 6,174,594 B1 | | 1/2001 | Smith et al. |
| 6,248,417 B1 | | 6/2001 | Ponsolle et al. |
| 8,216,641 B2 | | 7/2012 | Bouchard et al. |
| 2017/0184166 A1 | * | 6/2017 | Kirkpatrick ........... F16D 65/126 |

OTHER PUBLICATIONS

Extended Search Report from counterpart European Application No. 17153854.9, dated Jan. 11, 2018, 16 pp.
Partial European Search Report from counterpart European Application No. 17153854.9, dated Oct. 9, 2017, 17 pp.
Invitation Pursuant to Rule 63(1), from counterpart European Application No. 17153854.9, dated Jul. 25, 2017, 6 pp.
Response to Communication pursuant to Rules 63(1) dated Jul. 25, 2017, from counterpart European Application No. 17153854.9, filed Sep. 14, 2017, 12 pp.
Response to Extended Search Report dated Jan. 11, 2018, from counterpart European Application No. 17153854.9, filed Apr. 12, 2018, 11 pp.

* cited by examiner

DIFFERENTIAL NEEDLING OF A CARBON FIBER PREFORM

TECHNICAL FIELD

The disclosure relates to the manufacture of carbon-carbon composite materials, such as the manufacture of aircraft brake discs made of carbon-carbon composite materials.

BACKGROUND

Carbon-carbon composite materials are composite materials that include a matrix including carbon reinforced with carbon fibers. Carbon-carbon (C—C) composite components can be used in many high temperature applications. For example, the aerospace industry employs C—C composite components as friction materials for commercial and military aircraft, such as brake friction materials.

Some carbon-carbon composites, such as some carbon-carbon composite brake discs that are used in the aerospace industry, may be manufactured from porous preforms that include layers of carbon fiber, which may be densified using one or more of several processes, including chemical vapor deposition/chemical vapor infiltration (CVD/CVI), vacuum/pressure infiltration (VPI), or resin transfer molding (RTM), to infiltrate the porous preform with carbon. Prior to the densification process some preforms may be subjected to a needling process.

SUMMARY

In some examples, the disclosure describes a preform for making a carbon-carbon composite including a plurality of layers including carbon fibers or carbon-precursor fibers, where the plurality of layers are stacked along a central axis to form a stack, where the plurality of layers include a first exterior layer defining a first major surface of the preform, a second exterior layer defining a second major surface of the preform opposite the first major surface, and at least one interior layer disposed between the first exterior layer and the second exterior layer, the at least one interior layer having a peripheral region that forms a portion of an outer surface of the preform; and a plurality of needled fibers, where at least some needled fibers of the plurality of needled fibers extend through two or more layers of the plurality of layers; where the preform has an exterior region and a core region, where the exterior region includes at least the peripheral region of the at least one interior layer; where the plurality of needled fibers define a first needled fiber number density (NFND) in the exterior region and a second NFND in at least a portion of the core region, where the second NFND is greater than the first NFND.

In some examples, the disclosure describes a method including stacking a plurality of layers including carbon fibers or carbon-precursor fibers along a central axis to form a stack, where the plurality of layers includes a first exterior layer, a second exterior layer, and at least one interior layer disposed between the first and second exterior layers, where the at least one interior layer includes at least one peripheral region adjacent to an exterior surface of the stack; and needling the stack substantially parallel to the central axis to form a preform including a plurality of needled fibers, where at least some needled fibers of the plurality of needled fibers extend through two of more layers of the plurality of layers, where the preform includes a core region and an exterior region, where the exterior region includes the at least one peripheral region of the at least one interior layer, where the exterior region at least partially surrounds the core region, where the plurality of needled fibers define a first needled fiber number density (NFND) in the exterior region and a second NFND in the core region, and where the second NFND is greater than the first NFND.

In some examples, the disclosure describes a carbon-carbon composite including a plurality of layers including carbon fibers, where the plurality of layers are stacked along a central axis to form a disc shaped stack defining an inner diameter and an outer diameter; a plurality of needled fibers, where at least some needled fibers of the plurality of needled fibers extend through two of more layers of the plurality of layers; and a densifying material disposed in the disc shaped stack, where the densifying material at least partially encases at least some of the carbon fibers and the plurality of needled fibers, where the carbon-carbon composite includes a first composite diameter region that forms the outer diameter of the disc shaped stack, a second composite diameter region that forms an inner diameter of the disc shaped stack, and a central region between the first composite diameter region and second composite diameter region, where the plurality of needled fibers define a first NFND in the first composite diameter region, a second NFND in the second composite diameter region, and a third NFND in the central region, where at least one of first NFND, or second NFND is different than the third NFND.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure describes techniques for producing a porous preform used to produce a densified carbon-carbon (C—C) composite that may be used, for example, to form a disc brake. The described porous preforms may include a plurality of layers including carbon fibers or carbon-precursor fibers that are needled together with a plurality of needled fibers. The placement and distribution of the needled fibers may be varied to create, for example, different needled fiber number densities in regions of the preform adjacent to at least one of the outer diameter or the inner diameter of the porous preform compared to one or more interior regions of the preform.

As used herein, "needled fiber number density" or "NFND" is used to describe the number of needled fibers within a unit volume of a preform. Thus a region having a higher NFND has a higher number (e.g., population density) of needled fibers per unit volume compared to a region having a lower NFND. The NFND may be represented as a percentage of the number of needled fibers compared to the total number of fibers within a unit of volume of a preform. For example, for a given unit of volume having a 10% NFND would include a needled fiber content of about 10%.

As used herein, "exterior region" of the preform is used to describe the exterior surfaces of a resultant needled preform that are subsequently removed by a machining process during the densification processing of the preform and may not be present in the final resultant C—C composite. The exterior region may include at least one peripheral region of an interior layer of the preform.

As used herein, "core region" of the preform is used to describe the portion of the preform that is converted into the final C—C composite. The core region may be partially or fully surrounded by the exterior region.

In some examples, increasing the NFND in regions of the porous preform adjacent to at least one of the outer diameter or the inner diameter of the porous preform, may improve the interlaminar shear strength of the final C—C composite in the regions near at least one of the outer diameter or the inner diameter where the shear forces are the highest without generating an excessive amount of needled fiber of other regions of the porous preform that could otherwise hinder the efficiency or ability to perform subsequent densification cycles on the porous preform such as cycles of chemical vapor deposition (CVD) or chemical vapor infiltration (CVI).

Figure 1:
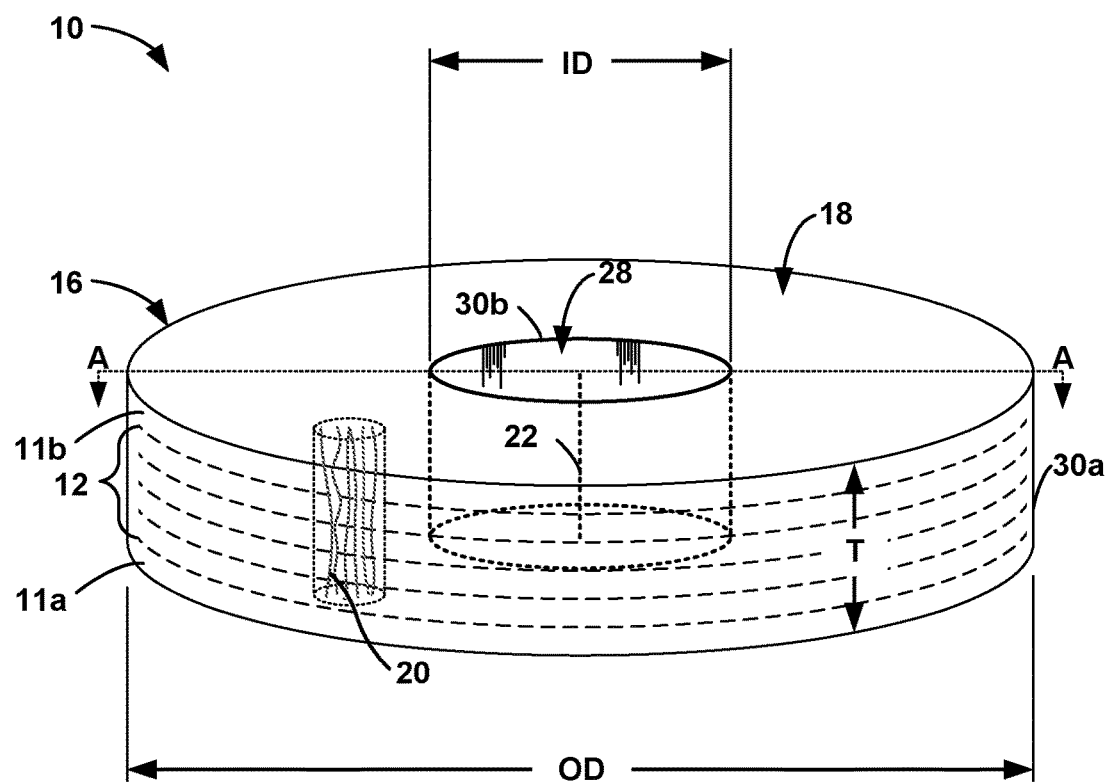
FIG. 1 is a schematic perspective view of an example preform that may be used to manufacture a densified carbon-carbon composite.

FIG. 1 is a schematic perspective view of an example preform 10 that may be used to manufacture a densified carbon-carbon composite. Preform 10 includes a first exterior layer 11a, a second exterior layer 11b, and a plurality of interior layers 12 (collectively, "plurality of layers 11 and 12") that include carbon fibers or carbon-precursor fibers. Plurality of layers 11 and 12 are stacked along a central axis 22 to form a stack 16. Preform 10 also includes a plurality of needled fibers 20 that at least partially extend through two of more layers of the plurality of layers 11 and 12. In some examples, needled fibers 20 may extend substantially vertically (e.g., vertically or nearly vertically) through stack 16 (e.g., generally parallel to central axis 22). While the accompanying figures illustrate needled fibers 20 as generally parallel to central axis 22, in some examples, at least some of needled fibers 20 may not be parallel to central axis 22 and may take on other orientations in stack 16 including, for example, wavy, angled, curved, or the like.

In some examples, preform 10 may be in the shape of a disc defining an outer preform diameter (OD). Preform 10 may also include a central aperture 28 that extends along central axis 22 through stack 16. Central aperture 28 may define an inner preform diameter (ID) of preform 10. In some examples the outer preform diameter (OD) of preform 10 may be between about 14.5 inches (e.g., about 37 cm) and about 25 inches (e.g., about 64 cm). The inner preform diameter (ID) of preform 10 may be between about 4.5 inches (e.g., about 12 cm) and about 15 inches (e.g., about 38 cm). In some examples, preform 10 may be a partial disc (e.g., crescent shaped) or a different geometry.

Figure 2:
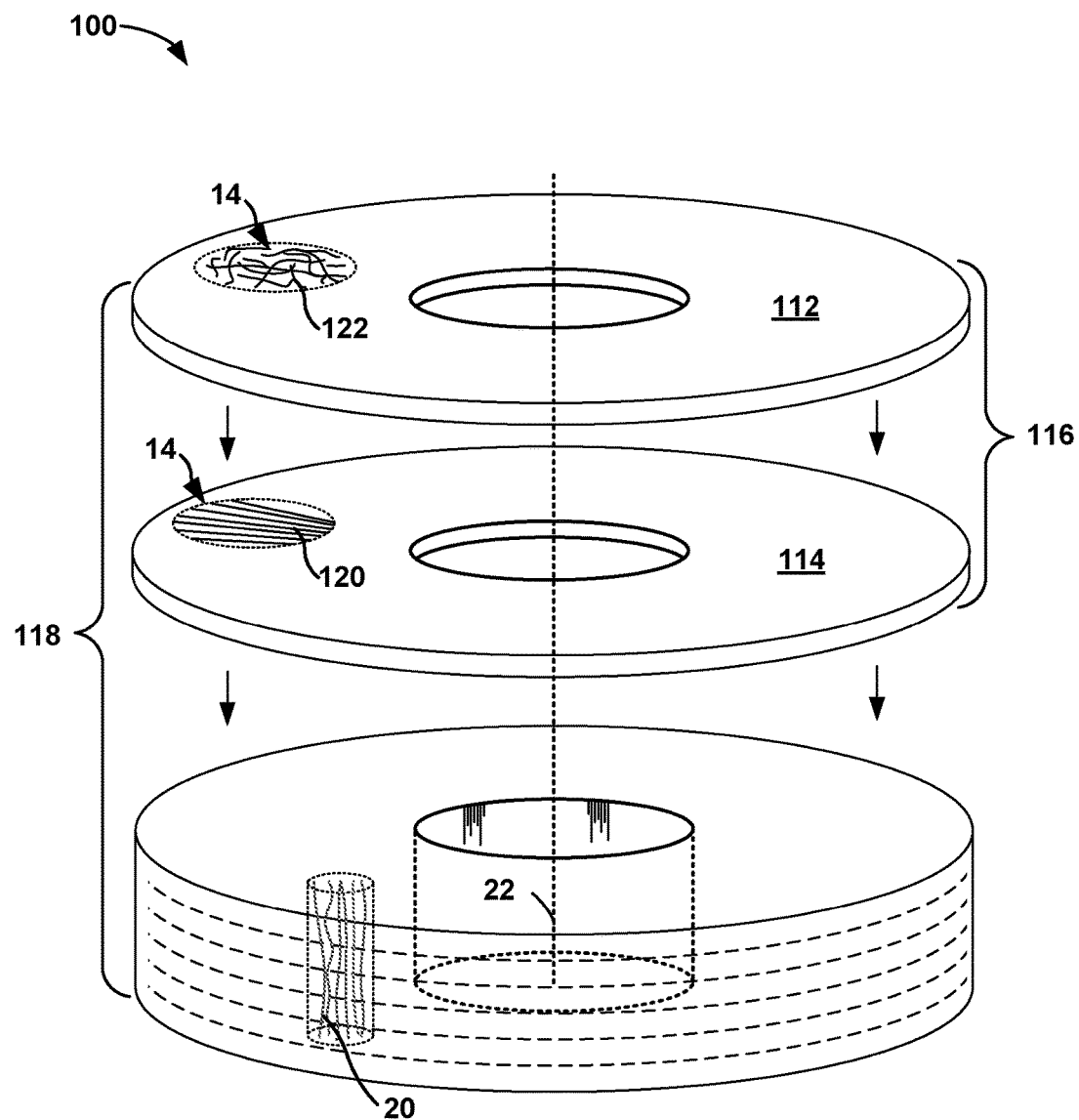
FIG. 2 is a schematic perspective view of an example stack that includes a plurality layers used for form a preform.

Plurality of layers 11 and 12 may include any suitable configuration of carbon fibers or carbon-precursor fibers. FIG. 2 is a schematic perspective view of an example stack 100 that includes a plurality layers 118 that include carbon fibers or carbon-precursor fibers (collectively "fibers 14") configured to form one or more tow layers 114, web layers 112, or combinations thereof. Tow layers 114 may include one or more tows 120 of fibers 14. Tows 120 of fibers 14 may be arranged in any suitable arrangement including, for example, linear, radial, chordal, or the like. Web layers 112 may include web fibers 122, which may include relatively short, chopped, and entangled fibers of fibers 14.

In some examples, plurality of layers 118 may include a plurality of tow layers 114, a plurality of web layers 112, or combinations thereof. For example, layers 118 may include a duplex layer 116 of fibers 14. In some such examples, duplex layer 116 may be formed by combining one or more tow layers 114 with one or more web layers 112. For example, web layer 112 may be needled on tow layer 118 to form duplex layer 116. The needling process may cause some of the web fibers 122 to partially transfer into tow layer 114 to join web layer 112 to tow layer 114. The web fibers 122 that partially transfer into tow layer 114 may form needled fibers (e.g., needled fibers 20 of FIG. 1). In some examples, formation of duplex layer 116 may incorporate one or more the needing techniques described herein to join tow layer 114 to web layer 112. In other examples, formation of duplex layer 116 may incorporate other needling techniques (e.g., a uniform distribution of needled fibers throughout duplex layer 116) with the resulting duplex layers 116 being joined to one another using one or more of the needing techniques described herein. As used herein the term "layer" of fibers 14 is not intended to be limited to one particular type of layer (e.g. web layer 112 or tow layer 114) and may include configurations where one or more layers are combined together (e.g., duplex layer 116 that includes a web layer 112 combined with a tow layer 114). Additionally, while some of the figures (e.g., FIG. 1) show a relatively small number of layers used form the respective stacks and preforms, the preforms (e.g., preform 10) produced as a result of the techniques describe herein may include any number of layers of fibers (e.g., 30 or more) to produce the desired thickness (T) of the resultant preform. In some examples, each layer 118 of fibers may have a thickness as measured in a direction parallel (e.g., parallel or nearly parallel) to central axis 22 of about 1 millimeter (mm) to about 2 mm.

In some examples, plurality of layers 118 may include high areal weight fiber layers (fabric) of carbon or a carbon precursor materials including, for example, oxidized polyacrylonitrile (O-PAN), rayon, or the like. In some examples, plurality of layers 118 may be formed to have an areal basis weight between about 1250 and about 3000 grams per square meter ($g/m^2$) such as, between about 1350 and about 2000 $g/m^2$. In some examples, forming layers 118 including high areal weight fiber layers (fabric), e.g., O-PAN fibers, may help increase the areal basis weight of plurality of layers 118, while maintaining an open pore construction which, as discussed further below, may help improve processing times and efficiency as well as reduce operation costs. In some examples, by increasing areal basis weight of layers 118 using high areal weight fiber layers (fabric) 114 may require less needling to join the respective layers 118 together while also establishing a more open stack 100 with wider and deeper pores which are more easily infiltrated with densifying material compared to other stacks with smaller or narrower pores, without substantially reducing the density of stack 100 compared to stacks and preforms made with lower areal basis weight fibers.

Returning to FIG. 1, stack 16 includes a first exterior layer 11a, at least one interior layer (e.g., plurality of interior layers 12), and a second exterior layer 11b. First exterior layer 11a may define a first major surface (not shown in FIG. 1) and second exterior layer 11b may define a second major surface 18 of preform 10. The separation between first major surface and second major surface 18 as measured substantially parallel to central axis 22 defines the thickness (T) of preform 10. In some examples the thickness (T) may be substantially uniform (e.g., uniform or nearly uniform) across preform 10.

While each of first exterior layer 11a and second exterior layer 11b are depicted and described as a single layer of fibers 14, in some examples, at least one of first exterior layer 11a or second exterior layer 11b may be a combination of two or more layers stacked together or may be a portion of a single layer.

Plurality of layers 11 and 12 (e.g., one or more web layers 112, tow layers 114, duplex layers 116, or the like described with respect to FIG. 2) may be needled together using a differential needling technique to form a plurality of needled fibers 20 within preform 10. In some examples, needled fibers 20 may be formed as a result of the needling process in which some of fibers 14 are at least partially transferred into one or more adjacent layers within stack 16. In some such examples, needled fibers 20 may be formed from web fibers (e.g., web fibers 122 of FIG. 2) that are punched/needled into one or more layers of plurality of layers 11 and 12. In some examples, needled fibers 20 may be formed from fibers 14 originally included in tows (e.g., tows 120 of FIG. 2) that are transferred into one or more adjacent layers within stack 16. For example, the needling process may break some of the fibers 14 contained in the tows and at least partially transfer the broken fibers into one or more adjacent layers within stack 16 to form needled fibers 20. In some examples, needled fibers 20 may help secure the layers of plurality of layers 11 and 12 to one another. Additionally or alternatively, the needling process and resulting needled fibers 20 may partially compress layers 12 to form a more dense preform compared to a stack 16 including layers 12 that have not been needled together.

Needled fibers 20 may include materials substantially the same (e.g., the same or nearly the same) as fibers 14. For example, needled fibers 20 may include carbon fibers or carbon-precursor fibers including, for example, oxidized polyacrylonitrile (O-PAN), rayon, or the like. In some examples, needled fibers 20 may be subjected to an initial carbonization cycle to convert any carbon-precursor materials to carbon.

Figure 3:
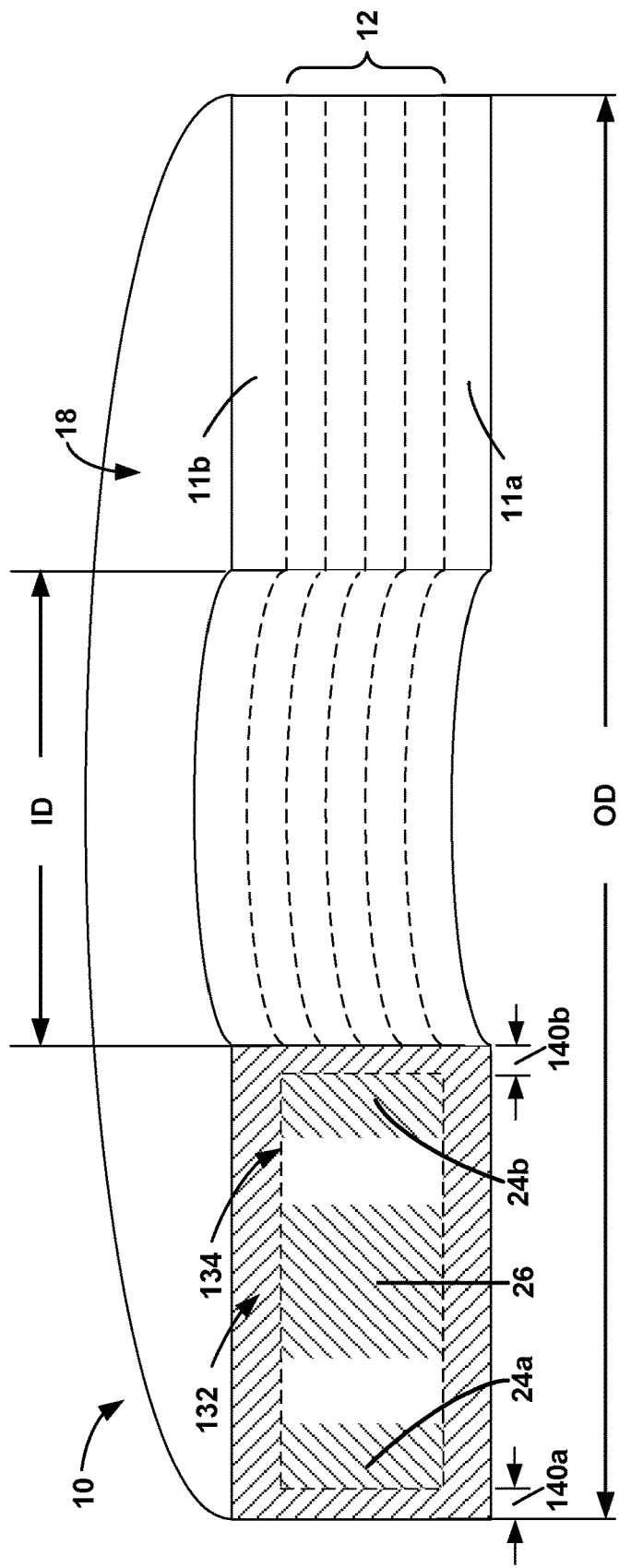
FIG. 3 is a schematic a cross-sectional view of the example preform from FIG. 1A along cross section A-A.

Each layer of plurality of layers 11 and 12 within stack 16 may be described in terms of different regions as described with respect to FIG. 3 which is a schematic a cross-sectional view of preform 10 from FIG. 1 along cross section A-A. Preform 10 may be described in terms of different regions including an exterior region 132 that may include regions of preform 10 that may be subsequently removed during part of the densification process (e.g., CVI densification) in which exterior region 132 may be machined away to expose core region 134 which represents the final dimensions of the resultant C—C composite produced through the densification process of preform 10. In some examples the exterior region 132 may include at least a first peripheral region 140a of plurality of interior layers 12 which may represent the region directly adjacent to the outer preform diameter (OD), and, optionally, first and second exterior layers 11a and 11b and a second peripheral region 140b of plurality of interior layers 12 which may represent the region directly adjacent to the inner preform diameter (ID).

In some examples in which preform 10 is in the form of a disc that includes central aperture 28, second peripheral region 140b may be positioned adjacent to inner preform diameter surface 30b (e.g., the region closet to central axis 22 defining inner preform diameter (ID)) and first peripheral region 140a may be positioned adjacent to outer preform diameter surface 30a of preform 10 (e.g., the region furthest from central axis 22 defining outer preform diameter (OD)).

The plurality of interior layers 12 may be further described in terms of different regions (e.g., regions of the plurality of interior layers 12 that describe core region 134) including a first composite diameter region 24a, a second composite diameter region 24b, and a central region 26 as describe further below. In some examples the plurality of interior layers 12 may include a first composite diameter region 24a, which represents the region of the plurality of interior layers 12 that will become the outer diameter of the resultant C—C composite after preform 10 has been densified and machined to size (e.g., the region forming the outer diameter of core region 134). In some examples, first composite diameter region 24a may be adjacent and radially inward to first peripheral region 140a within preform 10. In some examples the plurality of interior layers 12 may also include a second composite diameter region 24b, which represents the region of the plurality of interior layers 12 that will become the inner diameter of the resultant C—C composite after preform 10 has been densified and machined to size (e.g., the region forming the inner diameter of core region 134). In some examples, second composite diameter region 24b may be adjacent and radially outward to second peripheral region 140a within preform 10. In some examples, core region 134 of plurality or interior layers 12 may also include a central region 26 that is positioned radially between first composite diameter region 24a and second composite diameter region 24b.

In some examples, during the densification process (e.g., CVI/CVD) to densify porous preform 10 and produce a C—C composite, a carbonaceous gas may be deposited on and around fibers 14 and needled fibers 20 of preform 10 to increase the density and desired strength/friction characteristics of the resultant C—C composite. As preform 10 becomes densified, the buildup of carbon material from the carbonaceous gas applied using CVI/CVD may reduce the porosity of perform 10, particularly in exterior region 132, thereby reducing the ability of the carbonaceous gas to infiltrate and densify the interior regions of preform 10 (e.g., regions defining core region 134). In some examples, iteratively machining exterior region 132 during the densification process may help facilitate the diffusion of the carbonaceous gas into core region 134 by partially removing the exterior surface of preform 10 to remove portions of preform 10 where the pores may become occluded or significantly constricted.

In some examples, the densification process may be improved using differential needling technique as described further below by producing preform 10 with a decreased needled fiber number density (NFND) in exterior region 132 compared to core region 134. For example, one or more of first exterior layer 11a, second exterior layer 11b, first peripheral region 140a of plurality of interior layers 12, and second peripheral region 140b of plurality of interior layers 12 (e.g., portions of preform 10 forming exterior region 132) may include a first NFND less than the NFND of the portions forming core region 134. Having the NFND in exterior region 132 of preform 10 remain relatively low to form a region with a higher porosity compared to core region 134 (e.g., a region with a higher NFND and therefore a lower porosity) may reduce the potential for a bottleneck effect within exterior region 132 that might otherwise occur. During subsequent CVI/CVD processing of preform 10, the higher porosity within exterior region 132 resulting from the lower NFND may facilitate greater diffusion of carbonaceous gas through the exterior region 132 into the core region 134.

In some examples, exterior region 132 may partially or fully surround core region 134. In some examples, exterior region 132 may define a thickness substantially orthogonal (e.g., orthogonal or nearly orthogonal) to first and second major surfaces (e.g., first major surface 18) of about 2 millimeters (mm) to about 10 mm per side (e.g., per major surface). Additionally or alternatively, the first and second peripheral regions 140a and 140b may have a thickness as measured in a radial direction substantially orthogonal (e.g., orthogonal or nearly orthogonal) to central axis 22 of about 6 mm. In some examples, the first and second peripheral regions 24a and 24b of core region 134 may have a thickness as measured in a radial direction substantially orthogonal (e.g., orthogonal or nearly orthogonal) to central axis 22 of about 5 mm to about 25 mm respectively.

Figure 4:
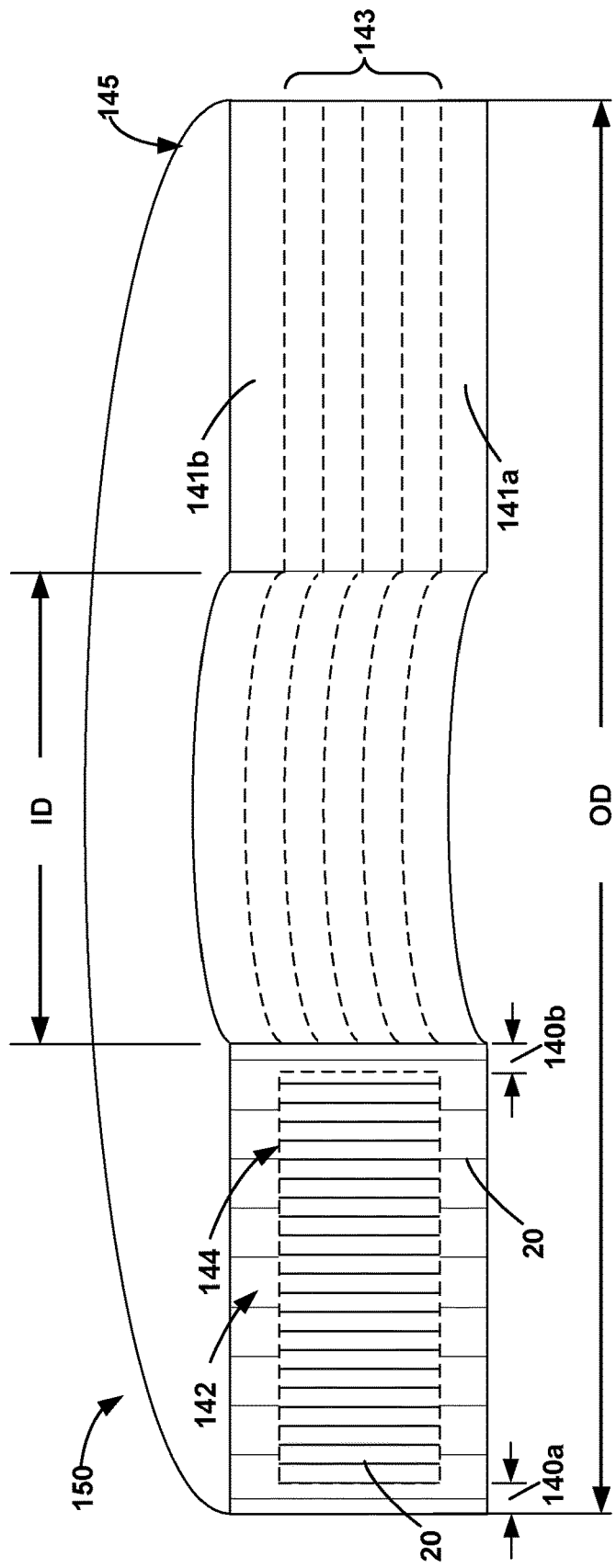
FIG. 4 is a schematic a cross-sectional view of an example preform.

FIG. 4 is a schematic cross-sectional view of an example preform 150 (e.g., cross-sectional view of preform 10 of FIG. 1 taken along intercept A-A) forming a stack 145 having a higher NFND of needled fibers 20 in core region 144 compared to exterior region 142. Preform 140 includes a first exterior layer 141a, a second exterior layer 141b, and plurality of interior layers 143 stacked to produce stack 145. In some examples, exterior region 142 may include a first peripheral region 140a of plurality of interior layers 143, and optionally one or more of first exterior layer 141a, second exterior layer 141b, and a second peripheral region 140b of plurality of interior layers 143. In some examples, core region 145 may include the interior regions of plurality or interior layers 143 (e.g., the portions of interior layers 143 forming the space radially between a first peripheral region 140a and second peripheral region 140b.

In some examples, increasing the NFND of core region 144 of stack 145 as shown in FIG. 4 may help improve processing efficiency of preform 150 and/or performance characteristics of the resultant C—C composite. For example, increasing the NFND within core region 144 of stack 145 (e.g., the interior regions of the plurality of interior layers 143) may help improve the thermal conductivity away from the major surfaces of the resultant C—C composite (e.g., the major surface that will be defined by core region 144 after subsequent machining and densification) by increasing the quantity of needled fibers 20 available to transfer heat away from the major surfaces. This may improve the friction performance of the C—C composite compared to a C—C composite that does not include a core region 144 having a higher NFND.

Additionally or alternatively, in some examples, the differential needling techniques described herein to form preform 10 may result in preform 10 having different NFND within the different regions of core region 134. The resultant differential needling may be used to make a preform having one or more NFND gradients within the core region 134 of the preform 10. In some examples, as discussed below, the one or more NFND gradients may be in a radial direction of the preform (e.g., NFND gradient produced as measured from the inner preform diameter (IN) to the outer preform diameter (OD)).

Figure 5A:
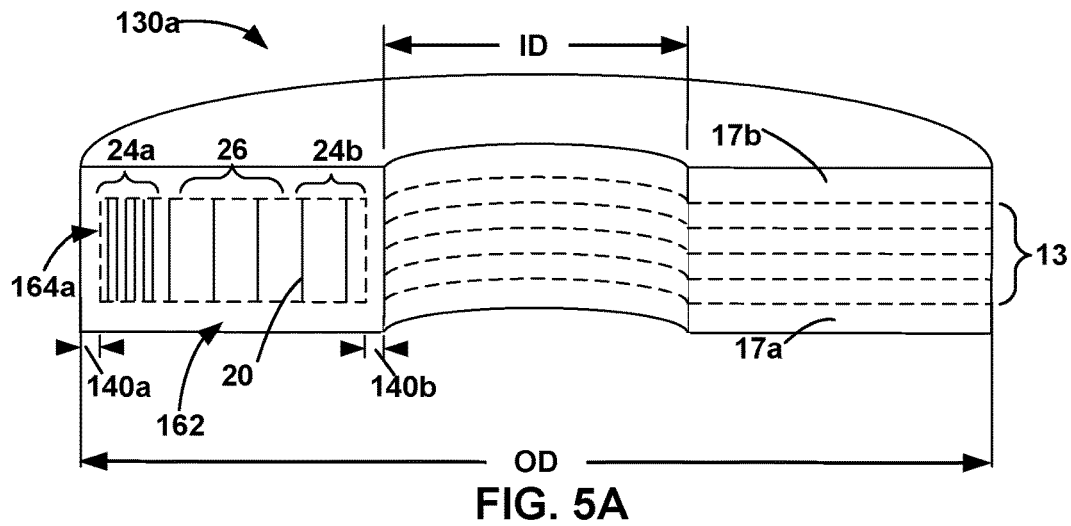
FIGS. 5A-5E are schematic cross-sectional views of examples of core regions of a preform.

FIG. 5A is a schematic cross-sectional view of an example preform 130a (e.g., preform 10 of FIG. 1 along cross-section A-A) with a plurality of layers that include a first exterior layer 17a, a second exterior layer 17b, and a plurality of interior layers 13 (collectively "plurality of layers 13 and 17), which are joined together with a plurality of needled fibers 20 that at least partially extend through two or more of the plurality of layers 13 and 17. Preform 130a may include an exterior region 162 and a core region 164a. In some examples the NFND of exterior region 162 (not shown for clarity) may be less than the NFND of core region 164a. As shown in FIG. 5A, core region 164a may include the interior portions of plurality of interior layers 13. In some examples, core region 164a may be further characterized in terms of different regions within core region 164a including a first composite diameter region 24a adjacent to first peripheral region 140a, a second composite diameter region 24b adjacent to second peripheral region 140b, and a central region 26 that lies radially between first composite diameter region 24a and second composite diameter region 24b. In some examples, first composite diameter region 24a may have a higher NFND relative to the other portions of core region 164a (e.g., second composite diameter region 24b and central region 26 of plurality of interior layers 13). The higher NFND of needled fibers 20 within first composite diameter region 24a may correlate to an improved interlaminar shear strength in the final C—C composite within first composite diameter region 24a (which may be along the outer diameter of the resultant C—C composite (e.g., outer diameter of core region 164a)), where shear forces may be more prevalent relative to other regions of the C—C composite. Additionally or alternatively, in some examples the higher NFND within first composite diameter region 24a may help improve the thermal conductivity and heat dissipation away from the friction surfaces of the C—C composite (e.g., major surfaces of core region 164a after densification and machining of preform 130a), thereby improving the friction performance of the C—C composite.

Figure 5B:
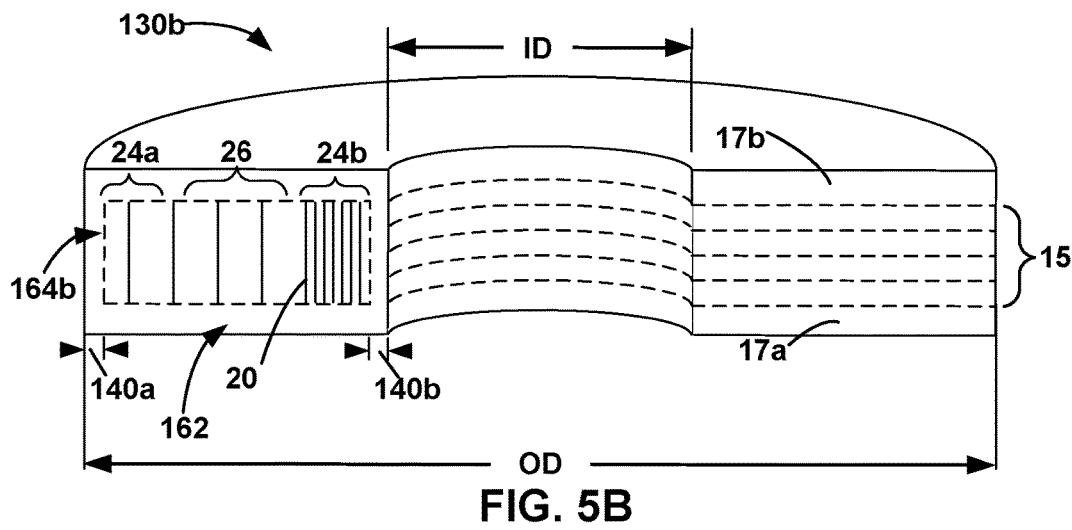

FIG. 5B shows another example of differential needling applied to a core region 164b of a preform 130b. FIG. 5B is a schematic cross-sectional view of another example preform 130b (e.g., preform 10 of FIG. 1 along cross-section A-A) with a plurality of layers that include a first exterior layer 17a, a second exterior layer 17b, and a plurality of interior layers 15 (collectively "plurality of layers 15 and 17), which are joined together with a plurality of needled fibers 20 that at least partially extend through two or more of the plurality of layers 15 and 17. Preform 130b may include an exterior region 162 and a core region 164b. In some examples the NFND of exterior region 162 (not shown for clarity) may be less than the NFND of core region 164b. As shown in FIG. 5B, core region 164b may include the interior portions of plurality of interior layers 15. In some examples, core region 164b may be further characterized in terms of different regions within core region 164b including a first composite diameter region 24a adjacent to first peripheral region 140a, a second composite diameter region 24b adjacent to second peripheral region 140b, and a central region 26 that lies radially between first composite diameter region 24a and second composite diameter region 24b. In some examples, second composite diameter region 24b may have a higher NFND relative to the other portions of core region 164b (e.g., first composite diameter region 24a and central region 26 of plurality of interior layers 15). In some examples, the higher NFND of needled fibers 20 within second composite diameter region 24b may correlate to an improved interlaminar shear strength within second composite diameter region 24b in the final C—C composite (e.g., along the inner diameter of the resultant C—C composite (e.g., inner diameter of core region 164b)).

Figure 5C:
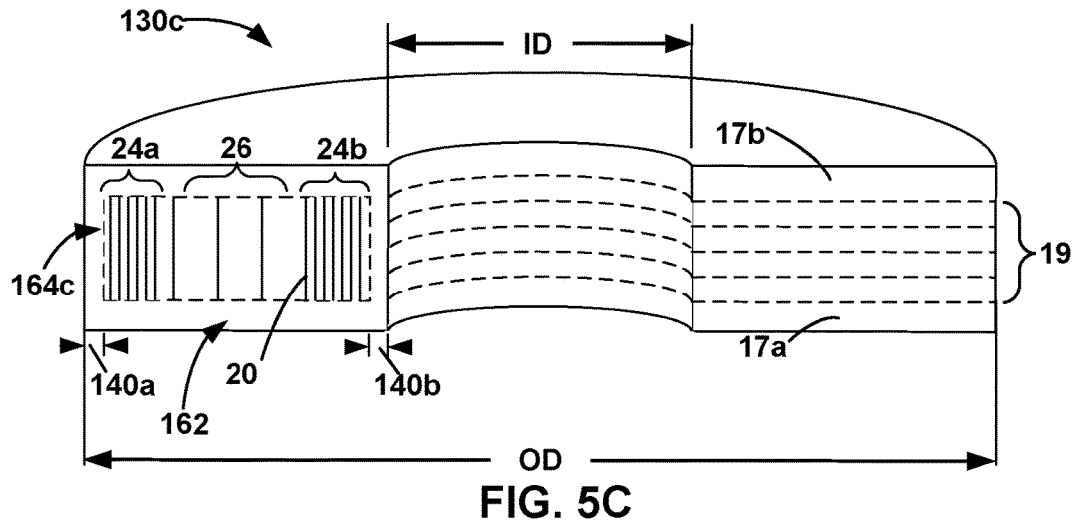

FIG. 5C shows another example of differential needling applied to a core region 164c of a preform 130c. FIG. 5C is a schematic cross-sectional view of another example preform 130c (e.g., preform 10 of FIG. 1 along cross-section A-A) with a plurality of layers that include a first exterior layer 17a, a second exterior layer 17b, and a plurality of interior layers 19 (collectively "plurality of layers 19 and 17), which are joined together with a plurality of needled fibers 20 that at least partially extend through two or more of the plurality of layers 19 and 17. Preform 130c may include an exterior region 162 and a core region 164c. In some examples the NFND of exterior region 162 (not shown for clarity) may be less than the NFND of core region 164c. As shown in FIG. 5C, core region 164c may include the interior portions of plurality of interior layers 15. In some examples, core region 164c may be further characterized in terms of different regions within core region 164c including a first composite diameter region 24a adjacent to first peripheral region 140a, a second composite diameter region 24b adjacent to second peripheral region 140b, and a central region 26 that lies radially between first composite diameter region 24a and second composite diameter region 24b. In some examples, first and second composite diameter regions 24a and 24b may have a higher NFND relative to the other portions of core region 164c (e.g., central region 26 of plurality of interior layers 19). Depending on the application of the final C—C composite, in some examples, both first and second composite diameter regions 24a and 24b (e.g., regions closest to the inner and outer diameter of the final C—C composite) may experience increased shear forces compared to the central region 26 of plurality of interior layers 19. Thus increasing the NFND of, both first and second composite diameter regions 24a and 24b of plurality of interior layers 19 compared to the NFND of central region 26 may help improve the shear strength of the resultant C—C composite.

Figure 5D:
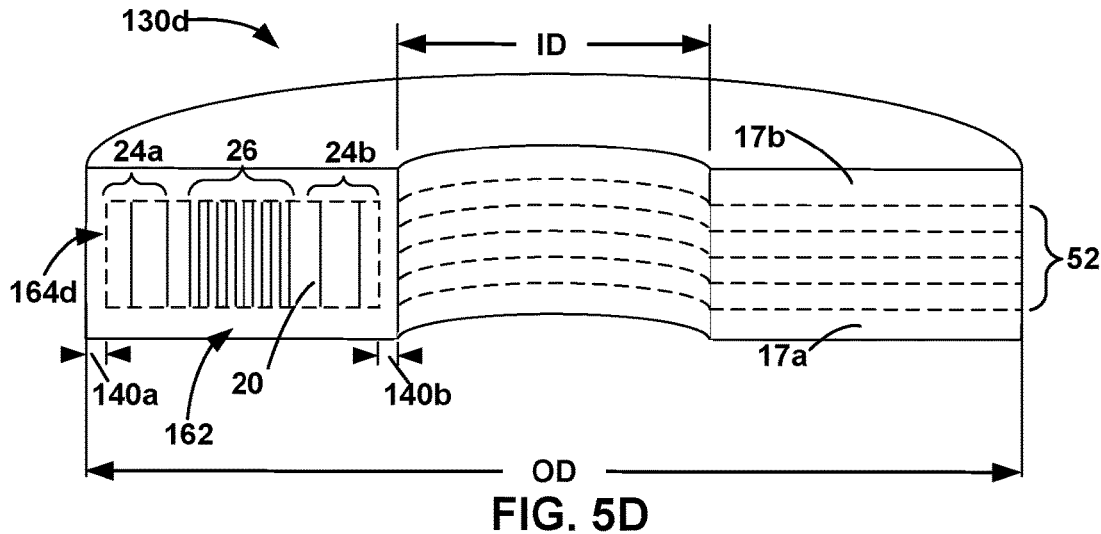
Figure 5E:
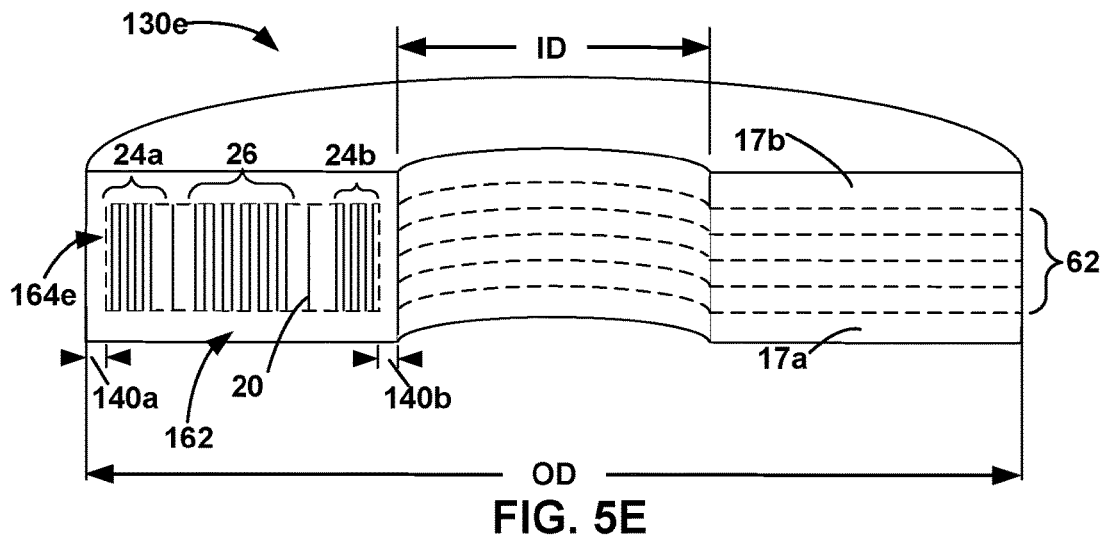

FIG. 5D shows another example of differential needling applied to a core region 164d of a preform 130d. FIG. 5D is a schematic cross-sectional view of example preform 130d (e.g., preform 10 of FIG. 1 along cross-section A-A) with a plurality of layers that include a first exterior layer 17a, a second exterior layer 17b, and a plurality of interior layers 52 (collectively "plurality of layers 52 and 17), which are joined together with a plurality of needled fibers 20 that at least partially extend through two or more of the plurality of layers 52 and 17. Preform 130d may include an exterior region 162 and a core region 164d. In some examples the NFND of exterior region 162 (not shown for clarity) may be less than the NFND of core region 164d. As shown in FIG. 5E, core region 164d may include the interior portions of plurality of interior layers 52. In some examples, core region 164d may be further characterized in terms of different regions within core region 164d including a first composite diameter region 24a adjacent to first peripheral region 140a, a second composite diameter region 24b adjacent to second peripheral region 140b, and a central region 26 that lies radially between first composite diameter region 24a and second composite diameter region 24b. In some examples, central region 26 may have a higher NFND relative to the other portions of core region 164b (e.g., first composite diameter region 24a and second composite diameter region 24b of plurality of interior layers 52). Such a construction may result in preform 130d having the highest NFND of needled fibers 20 in central region 26 of core region 164d, and the lowest NFND in exterior region 162. Increasing the NFND within central region 26 of preform 130d may help improve the thermal conductivity of the resultant C—C composite by increasing the quantity of needled fibers 20 available to transfer heat away from the major surfaces of the resultant C—C composite (e.g., major surfaces formed after densifying and machining preform 130d). This may improve the friction performance of the C—C composite compared to a C—C composite that does not include a central region 26 with a higher NFND compared to other regions of the composite.

FIG. 5E shows another example of differential needling applied to a core region 164e of a preform 130e. FIG. 5E is a schematic cross-sectional view of example preform 130e (e.g., preform 10 of FIG. 1 along cross-section A-A) with a plurality of layers that include a first exterior layer 17a, a second exterior layer 17b, and a plurality of interior layers 62 (collectively "plurality of layers 62 and 17), which are joined together with a plurality of needled fibers 20 that at least partially extend through two or more of the plurality of layers 62 and 17. Preform 130e may include an exterior region 162 and a core region 164e. In some examples the NFND of exterior region 162 (not shown for clarity) may be less than the NFND of core region 164e. As shown in FIG. 5E, core region 164e may include the interior portions of plurality of interior layers 52. In some examples, core region 164e may be further characterized in terms of different regions within core region 164e including a first composite diameter region 24a adjacent to first peripheral region 140a, a second composite diameter region 24b adjacent to second peripheral region 140b, and a central region 26 that lies radially between first composite diameter region 24a and second composite diameter region 24b. In some examples, first and second composite diameter regions 24a and 24b and central region 26 may have a higher NFND relative to the other portions of core region 164e (e.g., portions of core region 164e that make up the space between first composite diameter region 24a central region 26 and the space between second composite diameter region 24b and central region 26). Such a construction may result in preform 130e having the highest NFND of needled fibers 20 in first and second composite diameter regions 24a and 24b and central region 26 compared to other portions of preform 130e. In some examples, increasing the NFND in such regions may help improve the thermal conductivity of the resultant C—C composite as well as increase the interlaminar shear strength within the regions that will form the inner and outer diameters of the resultant C—C composite after preform 130e has been densified and machined. For example, the relatively low NFND in exterior region 162 compared the relatively high NFND of core region 164e, may help improve diffusion of carbonaceous gas towards core region 164e during CVI/CVD processing. Additionally, the relatively high NFND in first and second composite diameter regions 24a and 24b and central region 26 compared to other portions of core region 164e may also improve the interlaminar shear strength of the resultant C—C composite in the respective high NFND regions.

In some examples, the NFND within regions characterized as including a relatively high NFND may have a NFND greater than about 10% (e.g., about 10% to about 20%). In regions characterized as including a relatively low NFND, the NFND may be less than about 10% (e.g., about 5% to about 10%).

Figure 6:
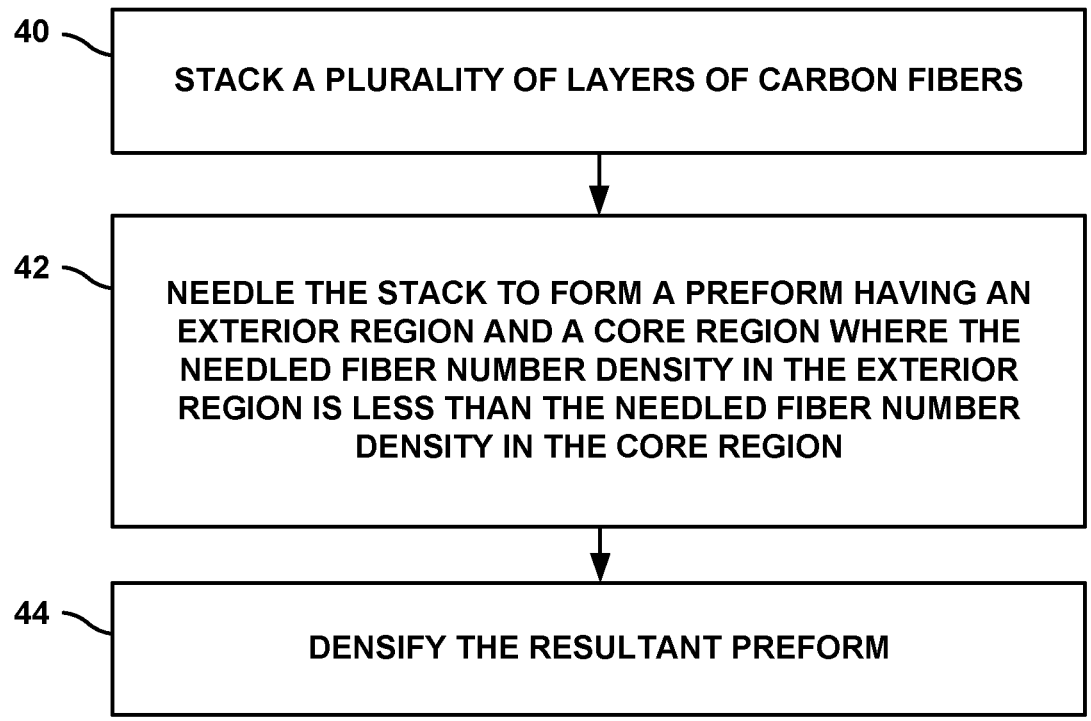
FIG. 6 is a flow diagram illustrating an example technique of manufacturing a preform.

The preforms described herein may be formed using any suitable technique. FIG. 6 is a flow diagram illustrating an example technique of manufacturing a preform. For ease of illustration, the example method of FIG. 6 is described with respect to the preforms and stacks of FIGS. 1-3 and 7A-7C; however, other stacks or preforms may be formed using the described techniques and the preforms and stacks of FIGS. 1-3 and 7A-7C may be made using other techniques.

The example technique of FIG. 6 includes stacking a plurality of layers 11 and 12 including fibers 14 along a central axis 22 to form a stack 16 (40). As described above, the each of the plurality of layers 11 and 12 may include any suitable number and configuration of layers that include fibers 14 including, for example, web layers 112 including web fibers 122 of fibers 14, tow layers 114 including tows 120 of fibers 14, duplex layers 116 including one or more web layers 112 needled to one or more tow layers 114, combinations thereof, or the like. Fibers 14 may include carbon fibers or carbon-precursor fibers. In some examples, the plurality of layers 11 and 12 may be prefabricated in the shape of a disc defining an inner preform diameter (ID) and an outer preform diameter (OD).

The technique of FIG. 6 also includes needling stack 16 to form a plurality of needled fibers 20 to form a preform 10 that includes an exterior region 132 representing the region of preform 10 forming the external surfaces (e.g., the first major surface, the second major surface 18, outer preform diameter surface 30a, and inner preform diameter surface 30b) and a core region 134, where exterior region 132 has first NFND less that the NFND in core region 134 (42). In some examples the exterior region may include the first and second exterior layers 11a and 11b, first peripheral regions 140a of interior layers 12, and second peripheral regions 140b of interior layers 12. In some examples, the exterior region 132 may include needled fibers 20 that define a first NFND and the core region 134 may include one or more regions defining a higher NFND of fibers 20 compared to the first NFND.

As describe above, needled fibers 20 may be formed as a result of the needling process in which some of fibers 14 of one or more of plurality of layers 11 and 12 are at least partially transferred into one or more of the other layers 11 and 12 within stack 16. In some such examples, needled fibers 20 may be formed from fibers 14 included as web fibers (e.g., web fibers 122 of FIG. 2) that are punched/needled into one or more layers of plurality of layers 11 and 12. In some examples, needled fibers 20 may be formed from fibers 14 originally included in tows (e.g., tows 120 of FIG. 2) that are transferred into one or more other layers 12 within stack 16. For example, the needling process may break some of the fibers 14 contained in the tows and at least partially transfer the broken fibers into one or more layers within stack 16 to form needled fibers 20.

In some examples, needled fibers 20 may be at least partially needled through two or more layers 12 to join the respective layers 12 together using, for example, a rotating annular needler or a non-rotating annular needler. In the case of annular needler, preform 10 may be formed by needling two or more of plurality of layers 11 and 12 together and then stacking (40) one or more additional layers 11 and 12 on top of the previously needled layers, and needling (42) the additional layers. In some examples, the annular needler may have a needle stroke rate of about 700 strokes per minute or more (for instance, a stroke speed between about 850 and about 1250 strokes/min) and a rotational bowl speed of about 2 rpm. In some examples, the needling time may be reduced by increasing the bowl rotation speed, e.g., 3 rpm, while keeping the ratio of strokes per rotation at about 350 strokes per rotation. In some examples, stack 16 may be needled (42) using a needling board with a selected distribution of needles, barb ratios, or both.

In some examples, during the needling process (42) the first exterior layer 11a may be placed on a pliable material, such as a foam ring, with one or more additional layers (e.g., interior layers 12) placed one on top of first exterior layer 11a to allow the needles and needled fibers 20 to penetrate all the way through first exterior layer 11a without damaging the needles. Stacking (40) and needling (42) of plurality of layers 11 and 12 may be continued until preform 10 reaches the target thickness T.

Figure 7A:
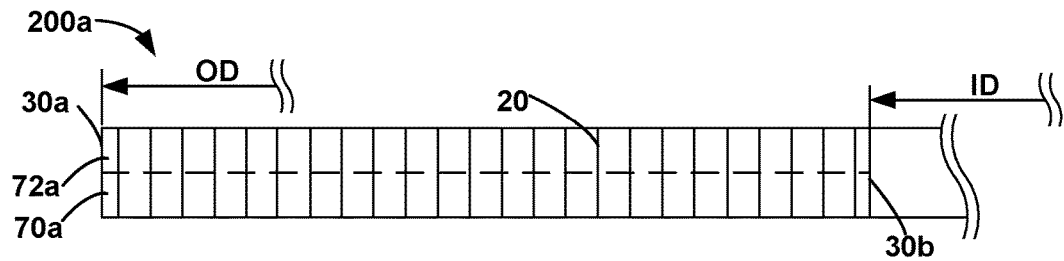
FIGS. 7A-7C are schematic cross-sectional views of portions of an example stack of a preform formed using three iterative needling processes.
Figure 7B:
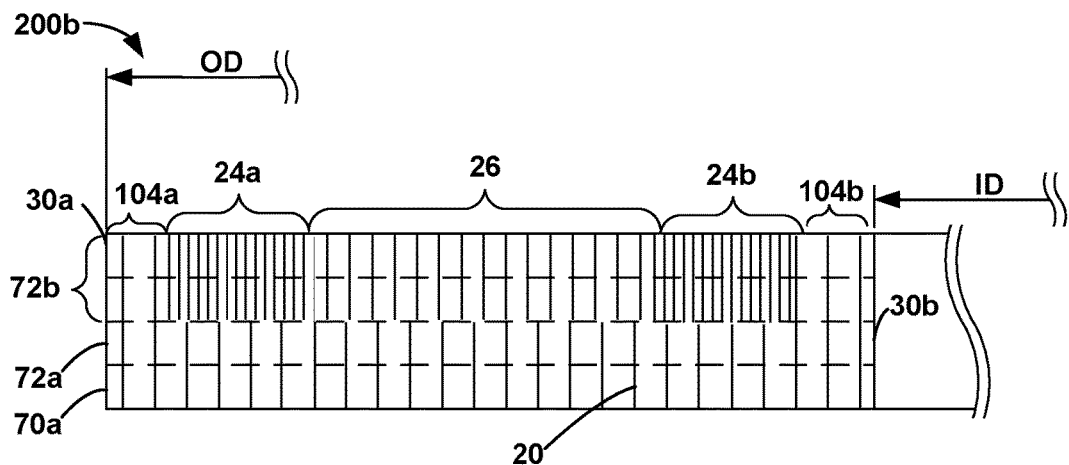
Figure 7C:
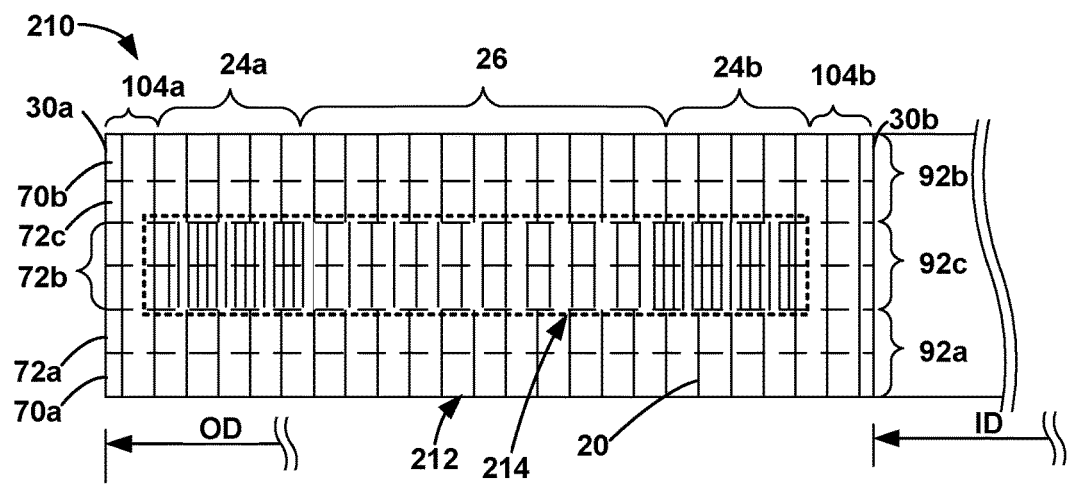

In some examples, plurality of layers 11 and 12 may be stacked (40) and needled (42) using a multistep iterative process to establish the different NFND regions as described above (e.g., FIGS. 4-5). For example, FIGS. 7A-7C show cross-sectional views of a portion of an example stack 200 being formed using three iterative needling processes. FIG. 7A shows a first needling process in which first exterior layer 70a and one or more interior layers 72 stacked (40) and needled (42) together. In some examples, needling of first exterior layer 70a (42) may result in at least first exterior layer 70a forming part of an exterior region 212 defining a first NFND of needled fibers 20. In some examples, the first NFND may be relatively uniform (e.g., uniform or nearly uniform) throughout the first exterior layer 70a.

In some examples, the first needling process needling to join first exterior layer 70a and one or more of interior layer 72a (42) may be performed with a needling board configured to define the desired NFND throughout the two layers the first set of layers to be joined. In some such examples, the needling board may be configured with a lower needle density to produce the first NFND in first exterior layer 70a. In some examples, the needling board may have a substantially uniform (e.g., uniform or nearly uniform) needle density.

FIG. 7B shows a second needling process in which one or more additional interior layers 72b have been stacked (40) on previously formed initial stack 200a and needled (42) to together to produce intermediate stack 200b. Interior layers 72b may be described in terms of at least 5 regions, which may include (moving from the outer diameter towards the inner diameter) a first peripheral region 104a directly adjacent to outer preform diameter surface 30a, a first composite diameter region 24a, a central region 26, a second composite diameter regions 24b, and a second peripheral region 104b directly adjacent to inner preform diameter surface 30b. As shown, interior layers 72b may be needled (42) to define a first NFND in the first and second peripheral regions 104a and 104b which may be substantially the same as the first NFND of first exterior layer 70a. Interior layers 72b also may be needled to define a second NFND in the first and second composite diameter regions 24a and 24b, and a third NFND in the central region 26. In some examples, both the second and third NFND may be greater than the first NFND (e.g., as described with respect to 4-5). In some examples the second NFND may be greater than the third NFND (e.g. as described with respect to FIG. 5C).

Needling of intermediate stack 200b (42) may be performed using any suitable technique. In some examples, needling of interior layers 72b to form intermediate stack 200b may be performed using a needling board configured to define the desired NFNDs in the respective regions described above. In some such examples, the needling board may include plurality of needles that are selectively distributed on the needling board to form desired NFNDs. For example, the needles may be non-uniformly distributed to on the needling board to include a larger concentration of needles in regions where a higher NFND is desired (e.g., first and second composite diameter regions 24a and 24b and/or central region 26). Additionally or alternatively, the needling board may include a plurality of needles having barbs where the number of barbs per needle is selectively varied to produce the desired NFNDs in the respective regions described above. For example, the needles in regions where a higher NFND is desired (e.g., first and second composite diameter regions 24a and 24b and/or central region 26) may include a larger number of barbs per needled compared to the needles in regions where a lower NFND is desired. The higher barb ratio in such regions may increase the number of needled fibers 20 produced in those regions to increase the NFND relative to portions of the needling board with a lower barb ratio. In some examples, the needling board used to needle interior layers 72b to initial stack 200a may be a different board than the needling board used to form initial stack 200a In some examples, during the needling of interior layers 72b, needled fibers 20 may be needled through at least a portion of interior layers 72a and/or first exterior layer 70a, to bind interior layers 72b to initial stack 200a.

FIG. 7C shows a third needling process in which one or more interior layers 72c and second exterior layer 70b are stacked (40) and needled (42) to the intermediate stack 200b on a side opposite of first exterior layer 70a to produce preform 210. As a result of the completed needling process, preform 210 may include an exterior region 212 and a core region 214 and. Exterior region 212 may include at least a first peripheral region 104a of interior layers 72a, 72b, and 72c, and optionally first exterior layer 70a, second exterior layer 70b, and a second peripheral region 104b of interior layers 72a, 72b, and 72c. Core region 214 may include the interior portions interior layers 72a, 72b, and 72c, which may be further described in terms of three or more regions that include first and second composite diameter regions 24a and 24b and central region 26. In some examples, needling of second exterior layer 70b (42) may be performed in similar manner to the technique used to form initial stack 200a. In some examples, the NFND in second exterior layer 70b may be relatively high compared to the NFND of regions within core region 214. In some examples, the second exterior layer 70b may include a relatively uniform (e.g., uniform or nearly uniform) NFND throughout the layer 70b, which may be substantially the same (e.g. the same or nearly the same) as the NFND in first exterior layer 70a and first and second peripheral regions 104a and 104b. In some examples, the needling board used to needle second exterior layer 70b may be the same as the needling board used to needle first exterior layer 70a.

In some examples, stacking (40) and needling (42) of layers 70a, 70b, 72a, 72b, and 72c to form preform 210 may form one or more NFND gradients or gradations in one or more directions through preform 210 such that the NFND increases moving from the exterior surfaces of preform 210 towards the center (e.g., center of core region 214).

In some examples, layers 12 of stack 16 may be needled together in sections with the respective sections needled together as a final step (42) to form preform 10 with the desired NFND within the respective regions. For example, layers 70a and 72a may be initially needled together to form initial stack 200a (e.g., section 92a). Similarly, layers 70b and 72c may be needled together to form a second initial stack (e.g., section 92b) substantially similar to initial stack 200a. An interior section made of interior layers 72b may be stacked and needled together (e.g. section 92c). The three sections 92a, 92b, and 92c may be stacked with section 92c in between sections 92a and 92b and needled together to from preform 210. In some such examples, the desired NFND of needled fibers 20 within the various regions of preform 10 may be produced during the initial needling of the independent sections 92a, 92b, and 92c, during the subsequent needling to join sections 92a, 92b, and 92c, to one another, or a combination of both. In some such examples, forming sections 92a, 92b, and 92c, independently may help ensure a relatively symmetric distribution of needled fibers 20 across the thickness of the preform 210 (e.g., a symmetric distribution between the major surfaces of preform 210 parallel to the central axis).

The example technique of FIG. 6 also includes optionally densifying the preform 10 (44) produced by stacking (40) and needling (42) layers 12 to form a C—C composite substrate. In some examples, the preform may be densified by applying one or more cycles of CVI/CVD of a carbonaceous gas. Any suitable carbonaceous gas may be used during the CVI/CVD processing including, for example, carbon-based gases such as natural gas, methane, ethane, propane, butane, propylene, or acetylene, or a combination of at least two of these gases. In some examples, the densification step (44) may produce a densified C—C composite substrate having a final density between about 1.65 and about 1.95 g/cc.

In some examples, the application of the carbonaceous gas to densify a preform 10 via CVI/CVD may occur substantially in a vacuum space (e.g., a vessel with an internal environment at less than 100 Torr) or under an inert gas environment so as to control the chemical deposition reaction. In some examples, during application of the CVI/CVD gas, the environment including preform 10 may be heated to an elevated temperature, for example between about 900° C. and about 1200° C., to promote the chemical deposition reaction.

In other examples, preform 10 may be densified (44) using other suitable techniques including for example, resin infiltration and carbonization via resin transfer mold (RTM) processing, vacuum pressure infiltration (VPI) processing, high pressure infiltration (HPI), or the like.

In some examples, preform 10 may be subjected to an initial carbonization cycle to convert the fibers 14 and/or needled fibers 20 to carbon, prior to being to undergoing a densification cycle (44). For example, preform 10 may be carbonized by heating preform 10 in a retort under inert or reducing conditions to remove the non-carbon constituents (hydrogen, nitrogen, oxygen, etc.) from fibers 14 and/or needled fibers 20. The carbonization can be carried out using retort, such as an autoclave, a furnace, a hot isostatic press, a uniaxial hot press, or the like. In each of these techniques, preform 10 may be heated in the inert atmosphere at a temperature in the range of about 600° to about 1000° C. while optionally being mechanically compressed. The mechanical compression may be used to define the geometry (e.g., thickness (T)) of preform 10. In some examples, the retort may be purged gently with nitrogen for approximately 1 hour, then slowly heated to about 900° C. over the course of approximately 10-20 hours, followed by elevating the temperature to about 1050° C. over approximately 1-2 hours. The retort then may be held at about 1050° C. for approximately 3-6 hours before the carbonized preform is allowed to cool overnight. In some examples, the carbonization step can be carried out at even higher temperature, including up to about 1800° C.

In some examples, during or after the densification of preform 10, the major surfaces of preform 10 may be machined to sculpt the resultant C—C composite substrate into the desired shape, such as a final brake disc shape. For example, after densification (44), one or more of first and second major surfaces 18 may be ground down partially using grinding equipment such as CNC (computer numerical control) machine to obtain a desired geometry. For example, C—C composite substrate may be ground in the shape of a densified C—C composite disc brake having a final thickness T (e.g., about 1.4 inches) having parallel major surfaces 18 (e.g., friction surfaces) and defining a desired inside diameter and outside diameter.

Various examples have been described. These and other examples are within the scope of the following claims.

What is claimed is:

1. A preform for making a carbon-carbon composite comprising:
   a plurality of layers comprising carbon fibers or carbon-precursor fibers, wherein the plurality of layers are stacked along a central axis to form a stack, wherein the plurality of layers comprise a first exterior layer defining a first major surface of the preform, a second exterior layer defining a second major surface of the preform opposite the first major surface, and at least one interior layer disposed between the first exterior layer and the second exterior layer, the at least one interior layer comprising a peripheral region that forms a portion of an outer surface of the preform; and
   a plurality of needled fibers, wherein at least some needled fibers of the plurality of needled fibers extend through two or more layers of the plurality of layers;
   wherein the preform has an exterior region and a core region, wherein the exterior region comprises the first exterior layer, the second exterior layer, and the peripheral region of the at least one interior layer;
   wherein the core region includes a first composite diameter region that forms an outer diameter of the core region as measured from the central axis, a second composite diameter region that forms an inner diameter of the core region as measured from the central axis, a central region that lies radially between first composite diameter region and second composite diameter region, a first intermediate region that lies radially between the central region and the first composite diameter region, and a second intermediate region that lies radially between the central region and the second composite diameter region,
   wherein the plurality of needled fibers define a first needled fiber number density (NFND) in the exterior region, a second NFND in the first composite diameter region, a third NFND in the second composite diameter region, a fourth NFND in the central region, a fifth NFND in the first intermediate region, and a sixth NFND in the second intermediate region,
   wherein the second NFND, third NFND, fourth NFND, fifth NFND, and sixth NFND are each greater than the first NFND, and
   wherein the fourth NFND is greater than at least one the fifth NFND or the sixth NFND.

2. The preform of claim 1,
   wherein the fourth NFND is greater than the fifth NFND and the sixth NFND.

3. The preform of claim 1, wherein the preform defines a disc shape with the first and second major surfaces are substantially orthogonal to the central axis, wherein the first and second major surfaces are separated by a thickness of the preform measured parallel to the central axis, wherein the preform comprises an aperture through the thickness of the preform along the central axis,
   wherein the peripheral region of the at least one interior layer comprises a first peripheral region that forms an outer diameter of the disc shape; and
   wherein the at least one interior layer comprises a second peripheral region that forms an inner diameter of the disc shape.

4. The preform of claim 3, wherein the exterior region further comprises the second peripheral region.

5. A method comprising:
   stacking a plurality of layers comprising carbon fibers or carbon-precursor fibers along a central axis to form a stack, wherein the plurality of layers comprises a first exterior layer, a second exterior layer, and at least one interior layer disposed between the first and second exterior layers, wherein the at least one interior layer comprises at least one peripheral region adjacent to an exterior surface of the stack; and
   needling the stack substantially parallel to the central axis to from a preform comprising a plurality of needled fibers, wherein at least some needled fibers of the plurality of needled fibers extend through two of more layers of the plurality of layers;
   wherein the preform comprises a core region and an exterior region, wherein the exterior region comprises the first exterior layer, the second exterior layer, and the at least one peripheral region of the at least one interior layer;
   wherein the core region includes a first composite diameter region that forms an outer diameter of the core region as measured from the central axis, a second composite diameter region that forms an inner diameter of the core region as measured from the central axis, a central region that lies radially between first composite diameter region and second composite diameter region, a first intermediate region that lies radially between the central region and the first composite diameter region, and a second intermediate region that lies radially between the central region and the second composite diameter region,
   wherein the plurality of needled fibers define a first needled fiber number density (NFND) in the exterior region, a second NFND in the first composite diameter region, a third NFND in the second composite diameter region, a fourth NFND in the central region, a fifth NFND in the first intermediate region, and a sixth NFND in the second intermediate region,
   wherein the second NFND, third NFND, fourth NFND, fifth NFND, and sixth NFND are each greater than the first NFND, and
   wherein the fourth NFND is greater than at least one the fifth NFND or the sixth NFND.

6. The method of claim 5,
   wherein the fourth NFND, is greater than the fifth NFND and the sixth NFND.

7. The method of claim 6, wherein the second NFND, the third NFND, and the fourth NFND are greater than the fifth NFND and the sixth NFND.

8. The method of claim 6, wherein the fifth NFND and the sixth NFND are approximately equal.

9. The method of claim 5, wherein the preform defines a disc shape with the first and second major surfaces are substantially orthogonal to the central axis, wherein the first and second major surfaces are separated by a thickness of the preform measured parallel to the central axis, wherein the preform comprises an aperture through the thickness of the preform along the central axis,
   wherein the peripheral region of the at least one interior layer comprises a first peripheral region that forms an outer diameter of the disc shape; and wherein the at least one interior layer comprises a second peripheral region that forms an inner diameter of the disc shape.

10. The method of claim 9, wherein the exterior region further comprises the second peripheral region.

11. The method of claim 5, further comprising densifying the preform to form a carbon-carbon composite.

12. The method of claim 5, further comprising carbonizing the preform.

13. The method of claim 5, wherein needling the stack comprises:
using a needling board comprising a plurality of needles; and
distributing the plurality of needles on the needling board to form the first needled fiber number density and the second needled fiber number density.

14. The method of claim 5, wherein needling the stack comprises:
using a needling board comprising a plurality of needles comprising barbs; and
varying a number of barbs per needle to form the first needled fiber number density and the second needled fiber number density.

15. The method of claim 5, wherein needling the stack comprises varying the needling rate to form the first needled fiber number density and the second needled fiber number density.

16. The preform of claim 1, wherein the exterior region surrounds the core region.

17. The preform of claim 16, wherein the second NFND, the third NFND, and the fourth NFND are greater than the fifth NFND and the sixth NFND.

18. The preform of claim 1, wherein the second NFND, the third NFND, and the fourth NFND are greater than the fifth NFND and the sixth NFND.

19. The preform of claim 1, wherein the fifth NFND and the sixth NFND are approximately equal.

* * * * *